W. TURNBULL.
TRACTOR TRUCK MECHANISM.
APPLICATION FILED JUNE 2, 1917.

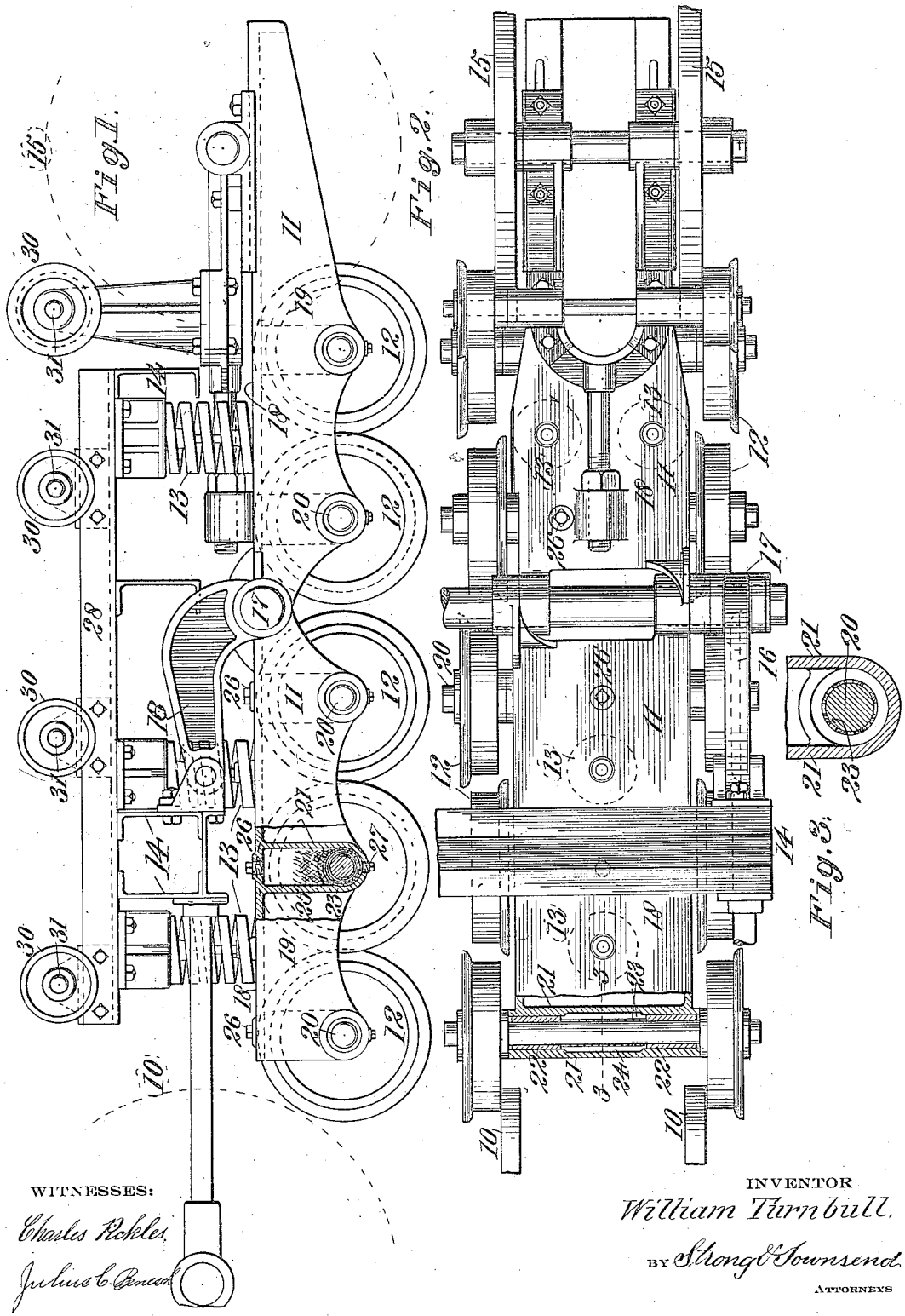

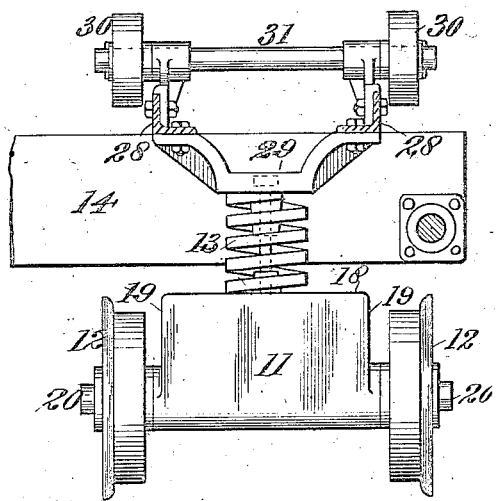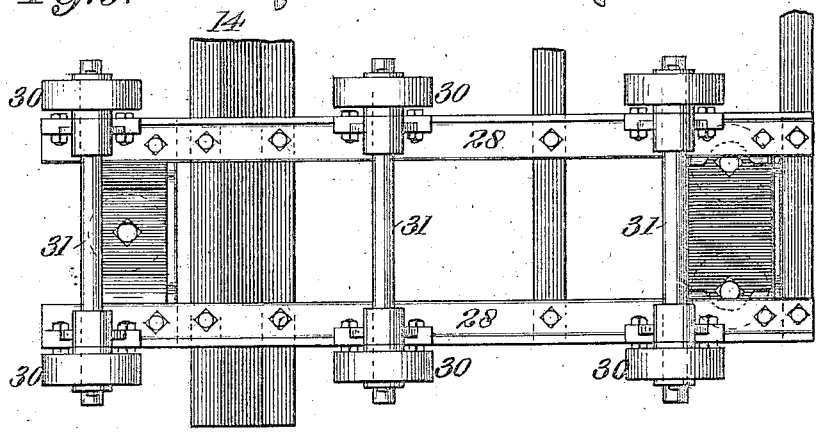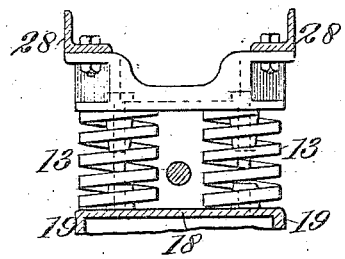

1,282,327.

Patented Oct. 22, 1918.
3 SHEETS—SHEET 3.

INVENTOR
William Turnbull
BY
Strong & Townsend
ATTORNEYS

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR TRUCK MECHANISM.

1,282,327.

Specification of Letters Patent.

Patented Oct. 22, 1918.

Application filed June 2, 1917. Serial No. 172,400.

*To all whom it may concern:*

Be it known that I, WILLIAM TURNBULL, a citizen of the United States, residing at Peoria, in the county of Peoria and State of Illinois, have invented new and useful Improvements in Tractor Truck Mechanism, of which the following is a specification.

This invention relates to tractors or other vehicles of the self-laying track type, as exemplified in my prior application Serial Number 77,382, filed February 10, 1916, and in the application of Emil F. Norelius and myself, Serial Number 135,462, filed December 6, 1916, wherein a double set of chain tracks is employed on each side of the vehicle, supported and driven by a double set of sprocket wheels, and the roller truck mechanism is made up of a series of pairs of rollers spaced co-axially apart, whereby an increased bearing and tread surface is provided for supporting heavy loads in soft and marshy lands.

One form which my invention may assume is exemplified in the following description and illustrated in the accompanying drawings, in which—

Figure 1 shows a side elevation of the roller truck mechanism, the rollers at the front being removed and the driving and supporting wheels for the endless track being shown in dotted lines.

Fig. 2 shows a plan view of the roller truck mechanism, with the longitudinal girder bars at the top thereof removed.

Fig. 3 shows a cross section of the self-oiling bearing employed therein, being taken on the line 3—3 of Fig. 2.

Fig. 4 shows an end elevation of the roller truck mechanism viewed from the rear.

Fig. 5 shows a plan view of the longitudinal girder bars at the top of the roller truck mechanism with their connected idler rollers for supporting the upper run of the chain track.

Fig. 6 shows a detail view of the cushioning and supporting springs between the roller truck mechanism and the main frame.

Figure 7:
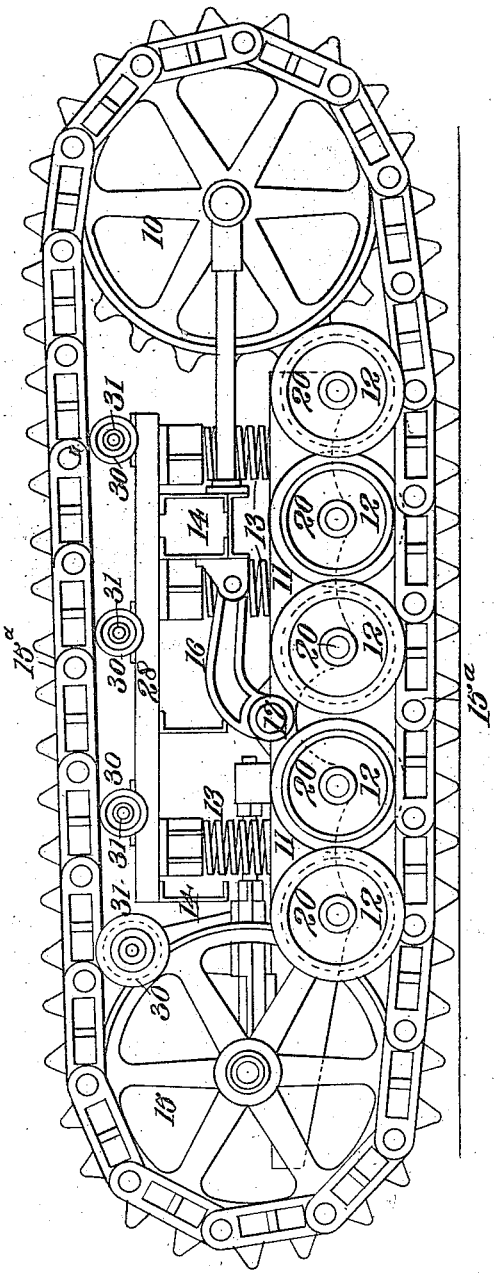
Fig. 7 shows a side elevation of a self-laying track mechanism embodying the invention.

In general, the truck mechanism comprises a pair of laterally spaced driving sprocket wheels 10, journaled upon the main frame of the tractor at the rear thereof and at each side, and an articulated roller truck frame 11 carrying a series of spaced pairs of rollers 12. Upon the roller truck frame are springs 13 which receive and support the main frame of the tractor through the rigid transverse beams 14. A pair of laterally spaced and axially alined idler wheels 15 is journaled on the forward end of one of the roller truck frame members and the endless, flexible track 15ª passes around the driving and idler wheels and forms a track for the rollers 12, said track comprising a double set of chains, as more fully shown and described in the prior applications referred to.

A bent link 16 is pivoted at its rear end to one of the transverse bars 14 and at the forward end to the joint 17 between the truck frame members 11 and serves as a thrust rod to propel the trucks and maintain the idler and driving wheels spaced apart. Each of the roller truck frame members 11 comprises a one-piece inverted channel bar embodying a top plate 18 and downwardly extending flanges 19 at opposite sides thereof. Each pair of rollers has an axle 20 journaled in the side flanges of the frame bar and extending transversely therethrough, Fig. 1 showing the outer ends of these axles with the rollers removed therefrom. The rollers are flanged and at each side the adjacent rollers have their flanges reversed.

A housing 21 for each axle is formed on the frame bar by casting a U-shaped web on the under portion of the top plate extending transversely between the side flanges and made integral therewith. Bushings 22 are fitted into the bearings at each side of the frame bars and between them carried upon the axle is a perforated collar 23. The portion of the housing surrounding the collar is reamed out to provide a chamber 24, into which a loose fabric or other permeable packing 25 may be inserted. The housing is filled with oil through the screw cap 26 in the top plate and the bearing surfaces lubricated by the passage of the oil through the packing, perforated collar and thence to the axle and passing longitudinally along the latter to the interior of the bushings. The oil is drained out through lower screw caps 27.

The springs 13 are seated upon the top plates of the roller truck frames, two of said springs being placed upon the rear frame member spaced fore and aft-wise apart and two being placed upon the front frame member spaced transversely apart. Longitudinal girders in the form of spaced angle bars 28 are secured to the projecting ends of the beams 14 and have saddles 29 secured between them and forming seats to rest upon the springs 13. Idler rollers 30, arranged in pairs upon the axles 31 journaled on the girder bars, provide supports and guides for the upper run of the chain track.

Having thus described my invention, what I claim and desire to secure by Letters Patent is—

1. In a tractor of the self-laying track type employing a double set of chain tracks on each side and a double set of driving and carrying wheels therefor, a roller truck mechanism embodying one-piece inverted channel bars hinged together, and axles journaled in the downwardly extending flanges of the bars and provided at each end with a roller to operate upon the adjacent chain track.

2. In a tractor of the self-laying track type employing a double set of chain tracks on each side and a double set of driving and carrying wheels therefor, a roller truck mechanism embodying one-piece inverted channel bars hinged together, axles journaled in the downwardly extending flanges of the bars and provided at each end with a roller to operate upon the adjacent chain track, and a housing for each axle formed on the bottom of the frame bar and extending between the flanges thereof, said housing being arranged to contain oil whereby to lubricate the bearings of the axle.

3. In a tractor of the self-laying track type employing a double set of chain tracks on each side and a double set of driving and carrying wheels therefor, a roller truck mechanism embodying one-piece inverted channel bars hinged together, axles journaled in the downwardly extending flanges of the bars and provided at each end with a roller to operate upon the adjacent chain track, a housing for each axle formed on the bottom of the frame bar and extending between the flanges of the bars and provided at each end with a roller to operate upon the adjacent chain track, a housing for each axle formed on the bottom of the frame bar and extending between the flanges thereof, said housing being arranged to contain oil whereby to lubricate the bearings of the axle, bushings at the sides of the frame bar projecting into the housing, and a perforated collar on the axle between the bushings.

4. In a tractor of the self-laying track type employing a double set of chain tracks on each side and a double set of driving and carrying wheels therefor, a roller truck mechanism embodying one-piece inverted channel bars hinged together, axles journaled in the downwardly extending flanges of the bars and provided at each end with a roller to operate upon the adjacent chain track, a housing for each axle formed on the bottom of the frame bar and extending between the flanges of the bars and provided at each end with a roller to operate upon the adjacent chain track, a housing for each axle formed on the bottom of the frame bar and extending between the flanges thereof, said housing being arranged to contain oil whereby to lubricate the bearings of the axle, bushings at the sides of the frame bar projecting into the housing, and a perforated collar on the axle between the bushings, said housing being reamed out at the portion surrounding the collar and packed at such portion with a permeable substance.

5. In a tractor of the self-laying track type employing a double set of chain tracks on each side and a double set of carrying wheels therefor, a roller truck mechanism embodying longitudinally extending one-piece frame bars hinged together, springs on the frame bars supporting the main frame of the tractor, and a link connection between the main frame and the joint of the frame bars serving to propel the roller truck mechanism.

6. In a tractor of the self-laying track type employing a double set of chain tracks on each side and a double set of carrying wheels therefor, a roller truck mechanism embodying articulated frame members, a pair of fore and aft spaced springs on the rear member, and a pair of transversely spaced springs on the front member serving to support and carry the main frame.

7. In a tractor of the self-laying track type employing a double set of chain tracks on each side and a double set of carrying wheels therefor, a roller truck mechanism embodying articulated frame members, cushioning and supporting springs on the roller truck frames, longitudinally extending, laterally spaced girder bars rigidly secured to the main frame at the sides thereof, and saddles extending between the girder bars and seated upon said springs.

8. In a tractor of the self-laying track type employing a double set of chain tracks on each side and a double set of carrying wheels therefor, a roller truck mechanism embodying articulated frame members, cushioning and supporting springs on the roller truck frames, longitudinally extending, laterally spaced girder bars rigidly secured to the main frame at the sides thereof, saddles extending between the girder bars and seated upon said springs, and axles journaled on the girder bars extending transversely thereof and carrying at each end a roller to support and guide the upper run of the adjacent track.

In testimony whereof I have hereunto set my hand in the presence of two subscribing witnesses.

WILLIAM TURNBULL.

Witnesses:
E. F. MORELIUS,
H. L. BOSWELL.